(12) United States Patent
Besson et al.

(10) Patent No.: US 10,839,978 B2
(45) Date of Patent: Nov. 17, 2020

(54) ELECTRIC CABLE WITH IMPROVED THERMOPLASTIC INSULATING LAYER

(71) Applicant: Prysmian S.p.A., Milan (IT)

(72) Inventors: Romain Besson, Milan (IT); Luigi Caimi, Milan (IT); Alberto Bareggi, Milan (IT); Armando Michele Ferrari, Milan (IT); Ivan Troia, Milan (IT)

(73) Assignee: Prysmian S.p.A., Milan (IT)

( * ) Notice: Subject to any disclaimer, the term of this patent is extended or adjusted under 35 U.S.C. 154(b) by 0 days.

(21) Appl. No.: 16/754,916

(22) PCT Filed: Oct. 12, 2017

(86) PCT No.: PCT/EP2017/076017
§ 371 (c)(1),
(2) Date: Apr. 9, 2020

(87) PCT Pub. No.: WO2019/072388
PCT Pub. Date: Apr. 18, 2019

(65) Prior Publication Data
US 2020/0312482 A1 Oct. 1, 2020

(51) Int. Cl.
*C08K 3/38* (2006.01)
*H01B 3/00* (2006.01)
(Continued)

(52) U.S. Cl.
CPC .............. *H01B 3/002* (2013.01); *C08K 3/38* (2013.01); *C08K 5/01* (2013.01); *C08K 7/00* (2013.01);
(Continued)

(58) Field of Classification Search
CPC ......... H01B 3/002; H01B 9/027; C08L 23/16; C08L 23/12; C08L 2203/202; C08K 3/38
(Continued)

(56) References Cited

U.S. PATENT DOCUMENTS 3,700,597 A    10/1972  Kastenbein et al.
2015/0228376 A1  8/2015  Ranganathan et al.
2018/0041086 A1*  2/2018  Madbouly .............. H02K 5/132

FOREIGN PATENT DOCUMENTS

EP    1702907 A2    9/2006
EP    1953194 A1    8/2008
EP    2615133 A1    7/2013
WO    WO-2002003398 A1    1/2002
(Continued)

OTHER PUBLICATIONS

International Search Report and Written Opinion dated Jul. 10, 2018 in PCT Application No. PCT/EP2017/076017.
(Continued)

*Primary Examiner* — Sherman Ng
(74) *Attorney, Agent, or Firm* — Element IP, PLC

(57) ABSTRACT

An electric cable for high-voltage applications is disclosed which comprises a core surrounded by an electrically insulating layer made of a composition based on a thermoplastic polymeric material charged with boron nitride powder in an amount up to 20 wt % with respect to the weight of the insulating composition, the boron nitride powder having a particle size distribution D50 up 0 to 15 μm. Such a cable has improved thermal conductivity property as well as good dielectric resistance and workability in particular through extrusion processes.

13 Claims, 1 Drawing Sheet

(51) Int. Cl.
| | |
|---|---|
| *C08K 7/00* | (2006.01) |
| *C08K 5/01* | (2006.01) |
| *C08L 23/12* | (2006.01) |
| *H01B 3/44* | (2006.01) |
| *C08L 23/16* | (2006.01) |
| *H01B 3/22* | (2006.01) |
| *H01B 9/02* | (2006.01) |

(52) U.S. Cl.
CPC ............... *C08L 23/12* (2013.01); *C08L 23/16* (2013.01); *H01B 3/441* (2013.01); *C08K 2003/385* (2013.01); *C08K 2201/005* (2013.01); *C08L 2203/202* (2013.01); *H01B 3/22* (2013.01); *H01B 9/027* (2013.01)

(58) Field of Classification Search
USPC ...................................................... 174/102 P
See application file for complete search history.

(56) References Cited

FOREIGN PATENT DOCUMENTS

| | | |
|---|---|---|
| WO | WO-2002027731 A1 | 4/2002 |
| WO | WO-2004066317 A1 | 8/2004 |
| WO | WO-2004066318 A1 | 8/2004 |
| WO | WO-2007048422 A1 | 5/2007 |
| WO | WO-2008058572 A1 | 5/2008 |
| WO | WO2013017916 A1 | 2/2013 |
| WO | WO-2013104859 A1 | 7/2013 |
| WO | WO2017060347 A1 | 4/2017 |

OTHER PUBLICATIONS

Reading, M. et al, "An investigation into improving the breakdown strength and thermal conduction of an epoxy system using boron nitride", Electrical Insulation and Dielectric Phenomena (CEIDP), 2011 Annual Report Conference on Oct. 16-19, 2011. pp. 636-639.

* cited by examiner

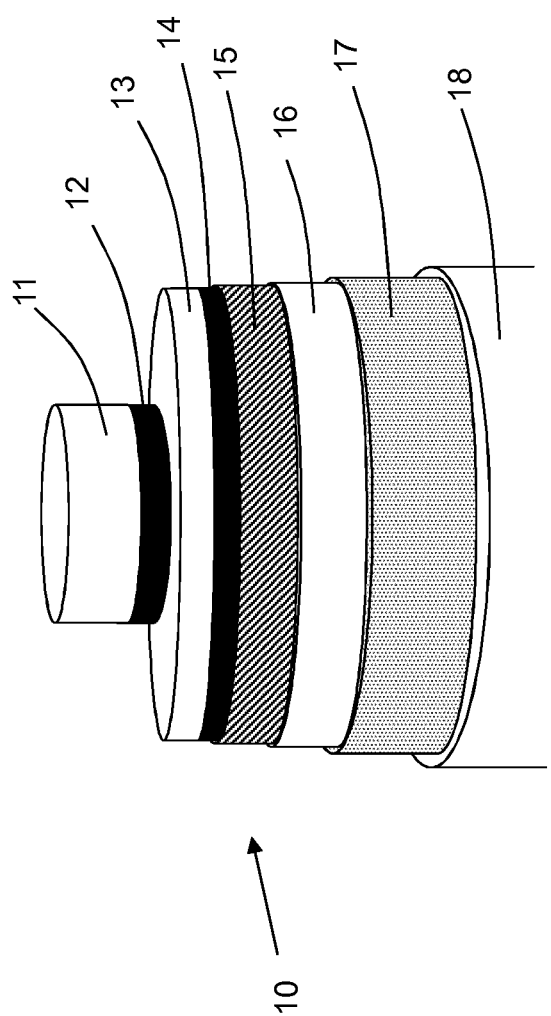

ELECTRIC CABLE WITH IMPROVED THERMOPLASTIC INSULATING LAYER

FIELD OF APPLICATION

The present disclosure relates to an electric cable having an improved thermoplastic insulating layer.

In particular, the present disclosure relates to an electric cable for transporting or distributing medium-voltage (MV) or high-voltage (HV) electric energy, comprising an electrically insulating layer made of a composition based on thermoplastic polymer material having high thermal conductivity.

PRIOR ART

Polypropylene can generate an important thermal resistance. This characteristic can be challenging in a cable having the insulating layer based on a thermoplastic polypropylene material, especially in the case of a high-voltage cable, as it can limit the current rating of the conductor to a significant extent. In addition, when cables, especially high-voltage direct current cables, are under tension, and the electric stress is above a threshold value, resistive currents may pass through the insulating layer and generate heat that is poorly dissipated by the polypropylene insulating material because of the low thermal conductivity thereof. Furthermore, the heat generated in the conductor and not dissipated by the low thermally conductive insulating material may decrease the resistivity of the polymeric material, causing electric leaks and incurring to a thermal instability.

As reported, for example, by U.S. Pat. No. 3,700,597, boron nitride (chemical formula BN) has an unusual combination of properties in that it is useful as an electrical insulator, and yet it is an excellent conductor of heat. BN exists in various crystalline forms that are isoelectronic, among which the main forms for industrial applications include the hexagonal form, called h-BN, which is similar to graphite, and the cubic form, called c-BN, which is similar to diamond.

Boron nitride can thus effectively increase the thermal conductivity of polymeric materials, but such an increase can be accompanied by a decrease of the dielectric resistance. The dielectric constant of BN ($\varepsilon=4.0 \div 4.4$ at 1 MHz) is the double of those of the thermoplastic polymers employed as insulation materials, and this can impair their electrically insulating properties. In addition, boron nitride can significantly increase the viscosity of the polymeric blend used for manufacturing the cable layer and make it difficult to be extruded as much as the amount of the boron nitride filler introduced in the polymeric blend increases.

US 2015/0228376 discloses a cable including a conductor surrounded by a covering layer. The covering layer is formed from a thermoplastic vulcanizate composition (TPV) which includes about 20% to about 90% of a continuous phase and about 10% to about 80% of a dispersed phase. The continuous phase includes a thermoplastic polyolefin and the dispersed phase includes an at least partially cross-linked elastomeric polymer. The TPV composition can also include a processing aid additive which, in turn, may include a dielectric fluid. The TPV composition may further include fillers such as boron nitride. No additional indication is provided about the use of boron nitride.

WO 2013/104859 discloses an electrically-insulating composite material having an electric resistivity that is greater than $10^{10}$ $\Omega$m, characterized in that said composite material consists of, in weight percent relative to the total weight of said composite material: at least 45% of a matrix of semi-crystalline and thermoplastic (co)polymer(s); between 20% and 54.5% of an h-BN filler having an average particle size D50 comprised between 10 µm and 45 µm; and between 0.5% and 5% of a coupling agent. The (co)polymer of the matrix can be selected, inter alia, from polyamides, polyphenylene sulfide and polypropylene. The tests relate to PPS (polyphenylene sulfone) and polyamide PA12 polymer and indicate that an improvement of thermal conductivity in a composition with a low concentration of boron nitride (20%) is obtained by adding a coupling agent. No indication is given about the D50 of the boron nitride used in the tests.

EP 1 702 907 discloses a polymeric composition comprising at least 35% by weight of a boron nitride (BN) powder coated with 0.5 to 5 wt. % of a zirconate coupling agent, and a method for increasing the thermal conductivity of polymeric compositions. In applications wherein the BN powder is to be used as fillers in polymer composites, 10 to 40 vol. % of the BN powder display an average particle size of about 5 to 25 microns (µm); about 60 to 90 vol. % of the particles display an average particle size of about 40 to 80 microns. Thermal conductivity data in a polymeric mixture are provided using silicon resin charged with 70% of a mixture of BNs with average particle size of 45 and 12 microns.

The publication by Reading M. et al., Electrical Insulation and Dielectric Phenomena (CEIDP), 2011 Annual Report Conference, 16-19 Oct. 2011, shows the improvement of the electrical insulation and thermal conductivity properties of a standard epoxy system using boron nitride fillers at a loading of 10% by weight. The boron nitride fillers tested in cured epoxy resin have a particle size ranging from 0.4 to 45 µm in an amount of 10 wt %. The ranking of thermal conductivity is unrelated to the particle size.

The technical problem underlying the present disclosure is that of providing an electric cable, in particular a medium- or high-voltage cable, comprising an electrically insulating layer made of a thermoplastic polymeric material, in particular of a polypropylene material, with improved thermal conductivity as well as maintaining a suitable dielectric resistance and workability in particular through extrusion processes.

The above mentioned prior art provide no clear indication. The tests, made on different materials, show that substantial amount of boron nitride (greater than 25 wt %) should be added to the polymeric matrix, but the Applicant experienced that boron nitride amounts greater than 20 wt % with respect to the total weight of a thermoplastic composition could not be conveniently extruded to form the insulating layer of an electric cable. In addition, significant amount of boron nitride could impair the dielectric properties of the insulating layer.

As for the boron nitride particle size, the teachings were rather confusing and no indication about the effect of the particle size of boron nitride is provided.

SUMMARY

The Applicant has found out that by adding boron nitride having a D50 particle size equal to or lower than 15 µm to a thermoplastic material for cable insulating layer the thermal conductivity of this material is improved without impairing its dielectric features.

This allows enhancing the threshold value to which the electrical resistivity of the thermoplastic polymeric insulating coating is stable under current temperature and electrical stress. As a result, the electrically insulting properties of the cable covering can also be improved, in particular with regard to the dielectric breakdown strength, which advantageously allows the cable according to the disclosure to be operated at voltages as high as 600 kV without incurring in electric leaks and/or thermal instability.

Such favourable effects are obtained by adding a limited amount of boron nitride having the above-mentioned particle size, even in the absence of any coupling agent.

DETAILED DESCRIPTION

In a first embodiment, the present disclosure relates to an electric cable comprising a core surrounded by an electrically insulating layer made of a composition based on a thermoplastic polymeric material charged with boron nitride powder in an amount up to 20 wt % with respect to the weight of the insulating composition, the boron nitride powder having a particle size distribution D50 up to 15 µm.

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

In the present description and in the subsequent claims, as "core" it is meant an electric conductor usually made from a metallic material such as aluminum, copper or composite thereof, either as a rod or as stranded multi-wires, or a conductor as above coated with a semiconductive layer. Optionally, in the case the electric conductor is in form of stranded multi-wires, a filling material is present among the wires to avoid propagation of water or humidity that can penetrate within the cable conductor.

For the purposes of the description, the term "medium voltage" means voltages of from 1 to 35 kV and the term "high voltage" means voltages higher than 35 kV.

As "electrically insulating layer", it is meant a layer made of a material having electrically insulating properties, namely having a dielectric rigidity (dielectric breakdown strength) of at least 5 kV/mm, preferably greater than 10 kV/mm.

In an embodiment, the electrically insulating layer of the cable of the present disclosure is in direct contact with the semiconductive layer of the cable core (also referred to as "inner semiconductive layer").

In some embodiments, the electrically insulating layer of the cable of the present disclosure is surrounded by and in direct contact with an outer semiconductive layer.

The electrically insulating layer of the present disclosure can have a thickness of at least 3 mm, for example of at least 12 mm. The thickness of the insulating layer depends on the voltage intended to be carried by the cable and on the overall structure of the cable (conductor compositions and configuration, kind of material employed for the insulating layers, etc.).

In the present description and in the appended claims, as "particle size distribution D50" it is meant the value of the particle diameter at 50% in the cumulative distribution. For example, if D50=15 µm, then 50% of the particles in the sample are larger than 15 µm, and 50% smaller than 15 µm. It can also be referred to as "median diameter" or "medium value" of the particle size distribution.

In the present description and in the appended claims, as "particle size distribution D100" it is meant the maximum theoretical size of the particle diameter in the cumulative distribution. For example, if D100=20 µm, substantially all of the particles in the sample have a diameter of 20 µm at most.

The Applicant has found that the amount and particle size of the boron nitride powder used in the insulating thermoplastic composition are critical for obtaining improved thermal conductivity performance and, at the same time, electrically insulating performances suitable for carrying medium or high voltages.

In an embodiment, the amount of boron nitride powder within the mixture of insulating composition is of at least 10 wt % with respect to the weight of the insulating composition. In another embodiment, the amount of boron nitride powder within the insulating composition is lower than 20 wt % with respect to the weight of the insulating composition.

If the amount of boron nitride in the insulating composition is of at least 10 wt %, more profitable improvement of the thermal conductivity of the thermoplastic composition is attained. On the other side, if the amount of boron nitride in the composition is lower than 20 wt %, in some cases the viscosity of the resulting mixture can be more suitable for the extrusion onto the cable core for forming the electrically insulating layer and can ease the manufacturing process.

In another embodiment, the particle size distribution D50 of boron nitride powder is up to 10 µm. In a further embodiment, the particle size distribution D50 of boron nitride powder is of 0.1 µm at least.

If the particle size distribution D50 of boron nitride used in admixture with the thermoplastic polymeric material is lower than 15 µm or, better, lower than 10 µm, the dielectric features of the resulting electrically insulating layer of the cable, especially in term of electric permittivity, can be maintained at values suitable for cables carrying high and extra-high voltages without electric leaks and avoiding incurring in thermal instability which render the cable unsuitable for such applications.

In an embodiment, the boron nitride powder in the cable of the disclosure has a particle size distribution D100 lower than 50 µm or, better, lower than 40 µm. The thermoplastic polymeric composition for insulating layer, especially suitable for high voltage cable, are generally filtered for eliminating contaminants potentially harmful for the current transport. Typically, a filter for thermoplastic polymeric composition for high voltage insulating layer is configured to prevent the passage therethrough of particles of 40 µm or more.

In some embodiments, boron nitride is in hexagonal form (h-BN). The use of h-BN advantageously allows not wearing the extruder and the cross head during the manufacturing of the insulating layer by extrusion of the thermoplastic polymeric composition on the cable core.

In an embodiment, the boron nitride powder is used as such, the surface of the powder particles being substantially uncoated.

In the present disclosure, the thermoplastic polymeric composition used for the electrically insulating layer may comprise a single thermoplastic polymer or a mixture of thermoplastic polymers.

According to an embodiment, the thermoplastic polymer material is selected from:
   a copolymer (i) of propylene with an olefin co-monomer selected from ethylene and an α-olefin other than propylene, said copolymer having a melting point of at least 130° C. and a melting enthalpy of from 20 J/g to 90 J/g;

a blend of a copolymer (i) with a copolymer (ii) of ethylene with an α-olefin, said copolymer (ii) having a melting enthalpy of from 0 J/g to 120 J/g;

a blend of a propylene homopolymer with a copolymer (i) or copolymer (ii);

at least one of copolymer (i) and copolymer (ii) being a heterophasic copolymer.

Within the present description and claims, the term "melting enthalpy" is to be intended as the overall melting enthalpy measured on the thermoplastic polymer by Differential Scanning calorimetry (DSC) analysis.

With "heterophasic copolymer" it is meant a copolymer in which elastomeric domains, e.g. of ethylene-propylene elastomer (EPR), are dispersed in a propylene homopolymer or copolymer matrix. The elastomeric domains constitute the elastomeric phase of the copolymer.

The olefin co-monomer in copolymer (i) can be ethylene or an α-olefin of formula $CH_2=CH-R$, wherein R is a linear or branched $C_2-C_{10}$ alkyl, selected, for example, from: 1-butene, 1-pentene, 4-methyl-1-pentene, 1-hexene, 1-octene, 1-decene, 1-dodecene, or mixtures thereof. In one embodiment, the copolymer (i) is a propylene/ethylene copolymer.

The olefin co-monomer in copolymer (i) is preferably present in an amount up to 15 mol %, more preferably up to 10 mol %.

The olefin co-monomer in copolymer (ii) can be an olefin of formula $CH_2=CHR$, wherein R represents a linear or branched alkyl group containing from 1 to 12 carbon atoms. Preferably, said olefin is selected from propylene, 1-butene, isobutylene, 1-pentene, 4-methyl-1-pentene, 1-hexene, 1-octene, 1-dodecene, or mixtures thereof.

In one embodiment, the co-monomer in copolymer (ii) is propylene, 1-butene, 1-hexene or 1-octene.

In another embodiment, the copolymer (ii) is a linear low-density polyethylene (LLDPE) copolymer. The olefin co-monomer in LLDPE may be present in an amount from 2 to 12 wt %.

According to some embodiments, copolymer (i) or copolymer (ii) is a random copolymer. With "random copolymer" it is meant a copolymer in which the co-monomers are randomly distributed along the polymer chain.

In copolymer (i) or copolymer (ii) or both, when heterophasic, an elastomeric phase can be present in an amount of at least 45 wt % with respect to the total weight of the copolymer.

In some embodiments, heterophasic copolymers (i) and/or (ii) are those wherein the elastomeric phase consists of an elastomeric copolymer of ethylene and propylene comprising from 15 wt % to 50 wt % of ethylene and from 50 wt % to 85 wt % of propylene with respect to the weight of the elastomeric phase.

In some embodiments, heterophasic copolymers (ii) are propylene copolymers, in particular:

(ii-a) copolymers having the following monomer composition: 35 mol %-90 mol % of ethylene; 10 mol %-65 mol % of an aliphatic α-olefin, such as propylene; 0 mol %-10 mol % of a polyene, such as a diene, for example 1,4-hexadiene or 5-ethylene-2-norbornene (EPR and EPDM rubbers belong to this class);

(ii-b) copolymers having the following monomer composition: 75 mol %-97 mol %, preferably 90 mol %-95 mol %, of ethylene; 3 mol %-25 mol %, preferably 5 mol %-10 mol %, of an aliphatic α-olefin; 0 mol %-5 mol %, preferably 0 mol %-2 mol %, of a polyene, such as a diene (for example ethylene/1-octene copolymers).

Heterophasic copolymers can be obtained by sequential copolymerization of: 1) propylene, possibly containing minor quantities of at least one olefin co-monomer selected from ethylene and an α-olefin other than propylene; and then of: 2) a mixture of ethylene with an α-olefin, in particular propylene, optionally with minor portions of a polyene.

The term "polyene" generally means a conjugated or non-conjugated diene, triene or tetraene. When a diene comonomer is present, this co-monomer generally contains from 4 to 20 carbon atoms and may be selected from: linear conjugated or non-conjugated diolefins such as, for example, 1,3-butadiene, 1,4-hexadiene, 1,6-octadiene, and the like; monocyclic or polycyclic dienes such as, for example, 1,4-cyclohexa-diene, 5-ethylidene-2-norbornene, 5-methylene-2-norbornene, vinyl-norbornene, or mixtures thereof. When a triene or tetraene comonomer is present, this comonomer generally contains from 9 to 30 carbon atoms and can be selected from trienes or tetraenes containing a vinyl group in the molecule or a 5-norbornen-2-yl group in the molecule.

In an embodiment, copolymer (i) or copolymer (ii) or both have a melting point of from 140° C. to 180° C.

In an embodiment, copolymer (i) has a melting enthalpy of from 25 J/g to 80 J/g.

In an embodiment, copolymer (ii) has a melting enthalpy of from 10 J/g to 90 J/g when heterophasic, and from 50 J/g to 100 J/g when homophasic (substantially free from heterophasic phase).

When the thermoplastic material of the insulating layer comprises a blend of copolymer (i) and copolymer (ii), the ratio between copolymer (i) and copolymer (ii) may be of from 1:9 to 8:2, preferably of from 2:8 to 7:3.

When the thermoplastic material of the insulating layer comprises a blend of a propylene homopolymer and at least one of copolymer (i) and copolymer (ii), the ratio between the propylene homopolymer and copolymer (i) or copolymer (ii) or both may be of from 0.5:9.5 to 5:5, preferably from 1:9 to 3:7.

In an embodiment, the thermoplastic material of the insulating layer comprises a blend of a propylene homopolymer with one copolymer (i) and two copolymers (ii); in this case, one of the copolymers (ii) is a heterophasic copolymer, while the other is homophasic.

According to another embodiment, the thermoplastic polymer can be selected from polyethylene homopolymers or copolymers, such as low-density polyethylene (LDPE) or linear low-density polyethylene (LLDPE); or 4-methyl-1-pentene.

According to an embodiment of the disclosure, the thermoplastic polymeric composition forming the electrically insulating layer comprises a dielectric fluid.

As to the dielectric fluid, proper compatibility between the dielectric fluid and the thermoplastic polymeric material is advantageous to obtain a microscopically homogeneous dispersion of the dielectric fluid in the polymer material. The dielectric fluid suitable for forming the thermoplastic electrically insulating layer should comprise no polar compounds or only a limited quantity thereof, in order to avoid a significant increase of the dielectric losses.

In the present description, "compatible" means that the chemical composition of the fluid and of the thermoplastic polymeric material are such as to result into a microscopically homogeneous dispersion of the dielectric fluid into the polymer material upon mixing the fluid into the polymer, similarly to a plasticizer.

Preferably, the concentration by weight of said the dielectric fluid in the thermoplastic polymer material is lower than the saturation concentration of said dielectric fluid in said thermoplastic polymer material. The saturation concentration of the dielectric fluid in the thermoplastic polymer material may be determined by a fluid absorption method on Dumbell specimens as described, for example, in WO 04/066317.

By using the dielectric fluid in an amount as defined above, thermo-mechanical properties of the insulating layer are maintained and exudation of the dielectric fluid from the thermoplastic material is avoided.

According to a further embodiment, the dielectric fluid has a melting point or a pour point of from −130° C. to +80° C.

Suitable dielectric fluids for use in the cable of the disclosure are described, e.g., in WO 02/03398, WO 02/27731, WO 04/066318, WO 07/048422 and WO 08/058572, all in the Applicant's name.

Preferably, the dielectric fluid is a synthetic or mineral oil of low or high viscosity, in particular a mineral oil, for example, a naphthenic, aromatic or paraffinic oil.

Other components (additives) may be added in minor amounts (for example, from 0.1 wt % to 1 wt % each) to the thermoplastic composition for the insulating layer of the present disclosure, including antioxidants, processing aids, voltage stabilizers, nucleating agents, or mixtures thereof.

According to an embodiment, the composition of the insulating layer of the present disclosure is free from compatibilizer or coupling agent for improving the interfacial properties (affinity) between the thermoplastic polymeric material and the boron nitride.

According to an embodiment, the cable according to the present disclosure includes at least one semiconductive layer. The semi-conductive layer is preferably formed by a semi-conductive material comprising the thermoplastic polymer and, optionally, the dielectric fluid as disclosed above, and at least one conductive filler, preferably a carbon black filler.

The conductive filler is generally dispersed within the thermoplastic material in a quantity such as to provide the material with semiconductive properties, namely to obtain a volumetric resistivity value, at room temperature, of less than 500 Ω-m, preferably less than 20 Ω-m. Typically, the amount of carbon black can range between 1 and 50% by weight, preferably between 3 and 30% by weight, relative to the weight of the polymer.

In an embodiment, the semiconductive layer/s of the cable of the disclosure is/are made of a composition comprising a thermoplastic polymeric composition charged with a conductive filler and with boron nitride powder in an amount up to 20 wt % with respect to the weight of the insulating composition, the boron nitride powder having a particle size distribution D50 up to 15 μm. For example, a semiconductive layer of the cable of the disclosure can contain 10 wt % of such boron nitride.

The use of the same base polymer composition for both the insulating layer and the semiconductive layer/s is particularly advantageous in producing cables for high voltage, since it ensures excellent adhesion between adjacent layers and hence a good electrical behaviour, particularly at the interface between the insulating layer and the inner semiconductive layer, where the electrical field and hence the risk of partial discharges are higher.

The cable according to the disclosure can be produced through conventional processes known in the art which include optionally impregnating the thermoplastic polymer material with the dielectric fluid, mixing the thermoplastic material with the boron nitride powder, and then depositing one or more layers of the composition including the thermoplastic material, boron nitride filler and optionally dielectric fluid, onto the cable core, preferably through extrusion.

In one embodiment, the extrusion of the semiconducting layer/s and of the electrically insulating layer is carried out in a single step, for example by the tandem method in which individual extruders are arranged in series, or by co-extrusion with a multiple extrusion head.

The cable according to the disclosure can be mainly used for transporting or distributing high voltage energy, for example voltages as high as 600 kV without incurring in electric leaks and/or thermal instability. In addition, the cable according to the disclosure can be used for either alternating current (AC) or direct current (DC) applications, particularly for high-voltage DC applications. In the case of high-voltage DC applications, the current leakage increases with the rising of the electric conductivity of the insulating layer which, in turn, increases with temperature and dielectric gradient. The more the heat is drained from the insulating layer, the more limited is the current leakage is limited and more stable is the overall insulating system.

In this connection, it should also be noted that the improved thermal conductivity and the suitable electric performances of the cable according to the disclosure are achieved through the addition of a lower amount of boron nitride powder compared to the prior art. This allows advantageously to maintain the production costs within acceptable limit in spite of the fact that boron nitride is expensive as such.

Further details will be illustrated in the following detailed description, with reference to the accompanying drawing, in which FIG. 1 shows a cable according to the present disclosure.

FIG. 1 shows a cable 10 according to the disclosure, suitable for transport medium or high voltage current. Cable 10 is a single core cable comprising a conductor 11 sequentially surrounded by an inner layer semiconducting layer 12, an electrically insulating layer 13 and an outer semiconducting layer 14. The conductor 11 and the inner layer semiconducting layer 12 constitutes the cable core.

The outer semiconducting layer 14 is surrounded by metal screen 15 which is surrounded, in turn, by a metal water-barrier 17. Between the metal screen 15 and the metal water barrier 17, a semiconducting tape 16 is interposed having cushioning and, preferably, or water-absorbent properties.

An outer sheath 18 is the outermost layer.

The conductor 11 generally consists of metal wires, preferably of copper or aluminium, stranded together by conventional methods, or of a solid aluminium or copper rod. The electrically insulating layer 13 and inner and outer semiconductive layers 12 and 14 are made of a thermoplastic composition according to the present disclosure.

The metal screen 15 is generally made of electrically conducting wires or tapes helically wound, while the metal water barrier 17 is generally made of aluminium or copper, preferably in form of a foil longitudinally wound around the metal screen 15.

The outer sheath 18 is generally made of thermoplastic polyethylene, for example high density polyethylene (HDPE) or medium density polyethylene (MDPE). The outer sheath 18 can be made of a material having low-smoke zero halogen flame-retardant properties.

FIG. 1 shows only one embodiment of a cable according to the invention. Suitable modifications can be made to this embodiment according to specific technical needs and application requirements without departing from the scope of the invention.

Example 1

Measures of Thermal Conductivity

A thermoplastic heterophasic ethylene-propylene copolymer (PP) having a melting temperature of 163° C. and a melting enthalpy of 26 J/g has been used alone or in admixture with boron nitride powder at different amounts and particle size distribution to create test samples of insulating compositions for cables.

The boron nitride powders tested, which are all hexagonal structures, are shown in Table 1.

TABLE 1

Boron nitride powders

| | Particle size distribution | |
|---|---|---|
| Boron Nitride | Mean D50 (μm) | Mean D100 (μm) |
| BN 1 | 7 | 30 |
| BN 2 | 4 | 40 |
| BN 3 | 12 | 60 |
| BN 4 | 16 | 60 |

In the preparation of the test samples according to the disclosure, the propylene copolymer, optionally previously intimately admixed with a dielectric fluid DF (dibenzyltoluene in an amount of 6 wt %) in a mixer, in form of granules was mixed with a preset amount of boron nitride in form of powder. The resulting dry mixture powder used was fed into a twin-screw extruder operated at about 200° C. to give a compound in form of plate. The plates, at least 3-4 mm thick, had the amounts and types of boron nitride fillers as indicated in Table 2 below. As reference, unfilled samples were also produced by extruding the thermoplastic heterophasic ethylene-propylene copolymer, optionally admixed with the above mentioned dielectric fluid DF without any boron nitride filler.

None of the tested composition comprised compatibilizers.

Measures of thermal conductivity (TC) were than performed on the samples so produced. The TC measurements were done at 70° C. using DTC-300 (TA Instruments) according to the method ASTM E 1530-11. Three pieces for each sample were used for the TC measurements and measurements were done before and after calibration with respect to reference unfilled samples.

The results are shown as a mean of the measurements for each type of samples in the following Table 2.

TABLE 2

| Composition | Polymer | BN (wt %) | TC [W/(m · K)] | TC increase (%) |
|---|---|---|---|---|
| 1* | PP + DF | — | 0.179 | — |
| 2 | PP + DF | BN 3 (2) | 0.184 | 3 |
| 3 | PP + DF | BN 3 (5) | 0.186 | 4 |
| 4 | PP + DF | BN 1 (10) | 0.200 | 12 |
| 5 | PP + DF | BN 1 (20) | 0.236 | 32 |
| 6 | PP + DF | BN 2 (10) | 0.201 | 12 |
| 7 | PP + DF | BN 2 (20) | 0.235 | 31 |
| 8* | PP + DF | BN 4 (20) | 0.156 | −13 |
| 9* | PP | — | 0.188 | — |
| 10* | PP | BN 4 (20) | 0.151 | −20 |

*comparative

From the above results it can be seen an increase of the thermal conductivity of the electrically insulating composition due to the addition of boron nitride according to the disclosure to the thermoplastic polymeric material compared to the thermoplastic polymeric material as such (comparative compositions 1 and 9). On the contrary, the addition of boron nitride with a D50 particle size greater than 15 μm (comparative composition 8 and 10) caused a thermal conductivity decrease in the insulating composition.

Additional compositions prepared as indicated above, but by adding a greater amount of boron nitride (more than 20%) to the thermoplastic polymeric material have shown that the viscosity of the polymeric composition becomes noticeably higher and renders difficult the extrusion by conventional extrusion processes.

Example 2

Measures of Electric Properties

Samples prepared according to the Example 1 were also tested for their electric properties namely electrical permittivity ε and, for some samples, electrical conductivity σ.

The measurement of permittivity ε was performed according to IEC 60250 (1969) and ASTM D150-92 (2004) on one sample for each composition, the samples having dimensions 200 mm×200 mm and 0.5 mm thick. The samples were subjected to a voltage of 0.5 kV and the measurements were done through a Shering bridge. The samples were varnished before the tests.

The results of the above electric measures are reported in Table 3 below.

TABLE 3

| Composition | ε |
|---|---|
| 1* | 1.9 |
| 2 | 2.1 |
| 3 | 2.2 |
| 5 | 2.5 |
| 7 | 2.6 |
| 8* | 2.5 |
| 9* | 2.5 |
| 10* | 2.9 |

*comparative

From the above results, it can be seen that the permittivity ε of the insulating composition increased with increasing amounts of boron nitride. In the case of the comparative composition 10 containing BN 4 (D50 particle size greater than 15 μm), permittivity resulted over the value suitable for an electrically insulating layer, especially for high voltage cables.

The measurements of electrical conductivity σ at 10 kV were performed according to IEC 60093 (1980) on one sample having dimensions 200 mm×200 mm and 1 mm thick for each composition. Voltage drop (Shunt characteristic) was measured using a picoammeter and a measurement cell provided with guard ring and put at a pressure of 20 bar.

While the tested compositions according to the present disclosure maintained electrical conductivity σ in the order of $10^{-16}$ 1/Ω·m, the comparative composition 8 containing BN 4 (D50 particle size greater than 15 μm) had a σ value of the order of $10^{-15}$ 1/Ω·m which is unsuitable for the electrically insulating layer of a cable, especially for high voltage cables.

The invention claimed is:

1. An electric cable, comprising: a core surrounded by an electrically insulating layer comprising an insulating composition, wherein the insulating composition is based on a thermoplastic polymeric material charged with boron nitride powder in an amount of up to 20 wt % with respect to a total weight of the insulating composition, and the boron nitride powder has a particle size distribution D50 of up to 15 µm, wherein the thermoplastic polymer material is selected from the group consisting of: a copolymer (i) of propylene with an olefin co-monomer selected from the group consisting of ethylene and an α-olefin other than propylene, wherein the copolymer (i) has a melting point of at least 130° C. and a melting enthalpy of from 20 J/g to 90 J/g, a blend of the copolymer (i) with a copolymer (ii) of ethylene with an α-olefin, wherein the copolymer (ii) has a melting enthalpy of from 0 J/g to 120 J/g, and a blend of a propylene homopolymer with either the copolymer (i) or the copolymer (ii); and at least one of the copolymer (i) and the copolymer (ii) is a heterophasic copolymer.

2. The electric cable according to claim 1, wherein the amount of the boron nitride powder is at least 10 wt % with respect to the total weight of the insulating composition.

3. The electric cable according to claim 1, wherein the amount of the boron nitride powder is less than 20 wt % with respect to the total weight of the insulating composition.

4. The electric cable according to claim 1, wherein the particle size distribution D50 of the boron nitride powder is up to 10 µm.

5. The electric cable according to claim 1, wherein the particle size distribution D50 of the boron nitride powder is at least 0.1 µm.

6. The electric cable according to claim 1, wherein boron nitride of the boron nitride powder has a hexagonal form.

7. The electric cable according to claim 6, wherein boron nitride particles of the boron nitride powder are uncoated.

8. The electric cable according to claim 1, wherein the boron nitride powder has a particle size distribution D100 of lower than 50 µm.

9. The electric cable according to claim 8, wherein the boron nitride powder has a particle size distribution D100 of lower than 40 µm.

10. The electric cable according to claim 1, wherein the thermoplastic polymeric material forming the electrically insulating layer comprises a dielectric fluid.

11. The electric cable according to claim 10, wherein the dielectric fluid is a synthetic or mineral oil of low or high viscosity.

12. The electric cable according to claim 11, wherein the dielectric fluid is a mineral oil, which is selected from the group consisting of a naphthenic oil, an aromatic oil, and a paraffinic oil.

13. The electric cable according to claim 1, comprising an inner and/or an outer semiconductive layer made of a composition comprising a thermoplastic polymeric composition charged with a conductive filler and with boron nitride powder in an amount of up to 20 wt % with respect to a total weight of the thermoplastic polymeric composition, wherein the boron nitride powder has a particle size distribution D50 of up to 15 pm.

* * * * *